J. U. MANISCHEWITZ.
MATZO BREAKER.
APPLICATION FILED SEPT. 10, 1920.

1,401,268.

Patented Dec. 27, 1921.
2 SHEETS—SHEET 1.

Inventor:
Jacob U. Manischewitz,
By Bryan D. Pinkney,
His Attorney.

J. U. MANISCHEWITZ.
MATZO BREAKER.
APPLICATION FILED SEPT. 10, 1920.

1,401,268.

Patented Dec. 27, 1921.
2 SHEETS—SHEET 2.

Inventor:
Jacob U. Manischewitz,
By Bryant Pinkney,
His Attorney.

UNITED STATES PATENT OFFICE.

JACOB U. MANISCHEWITZ, OF CINCINNATI, OHIO, ASSIGNOR TO THE B. MANISCHEWITZ COMPANY, A CORPORATION OF OHIO.

MATZO-BREAKER.

1,401,268.      Specification of Letters Patent.    Patented Dec. 27, 1921.

Application filed September 10, 1920. Serial No. 409,459.

*To all whom it may concern:*

Be it known that I, JACOB U. MANISCHEWITZ, a citizen of the United States, residing at Cincinnati, in the county of Hamilton and State of Ohio, have invented certain new and useful Improvements in a Matzo-Breaker, of which the following is a specification.

My invention relates to improvements in a matzo breaker, and may be used as a separate device or used in connection with a bake-oven. I have shown my improved matzo breaker as connected at the delivery end of the bake-oven invented by Behr Manischewitz, Patent Number 1,169,555, although I do not limit its use to any particular type of oven or other device.

The object of my invention is to enable the matzos and other form of crackers to be baked in a continuous "ribbon" or strip and broken or separated into predetermined sizes after they are baked. This insures a perfect product, uniform in size and shape. Were the matzos not baked in a continuous "ribbon" the corners would curl up and (on account of the corners getting closer to the fire or heating chamber) burn, or bake darker than the body part of the product. In other words, by being able to bake the matzos in a continuous strip every part of the product is uniform in texture and appearance, and of perfect form.

To the accomplishment of the above and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

Figure 1:
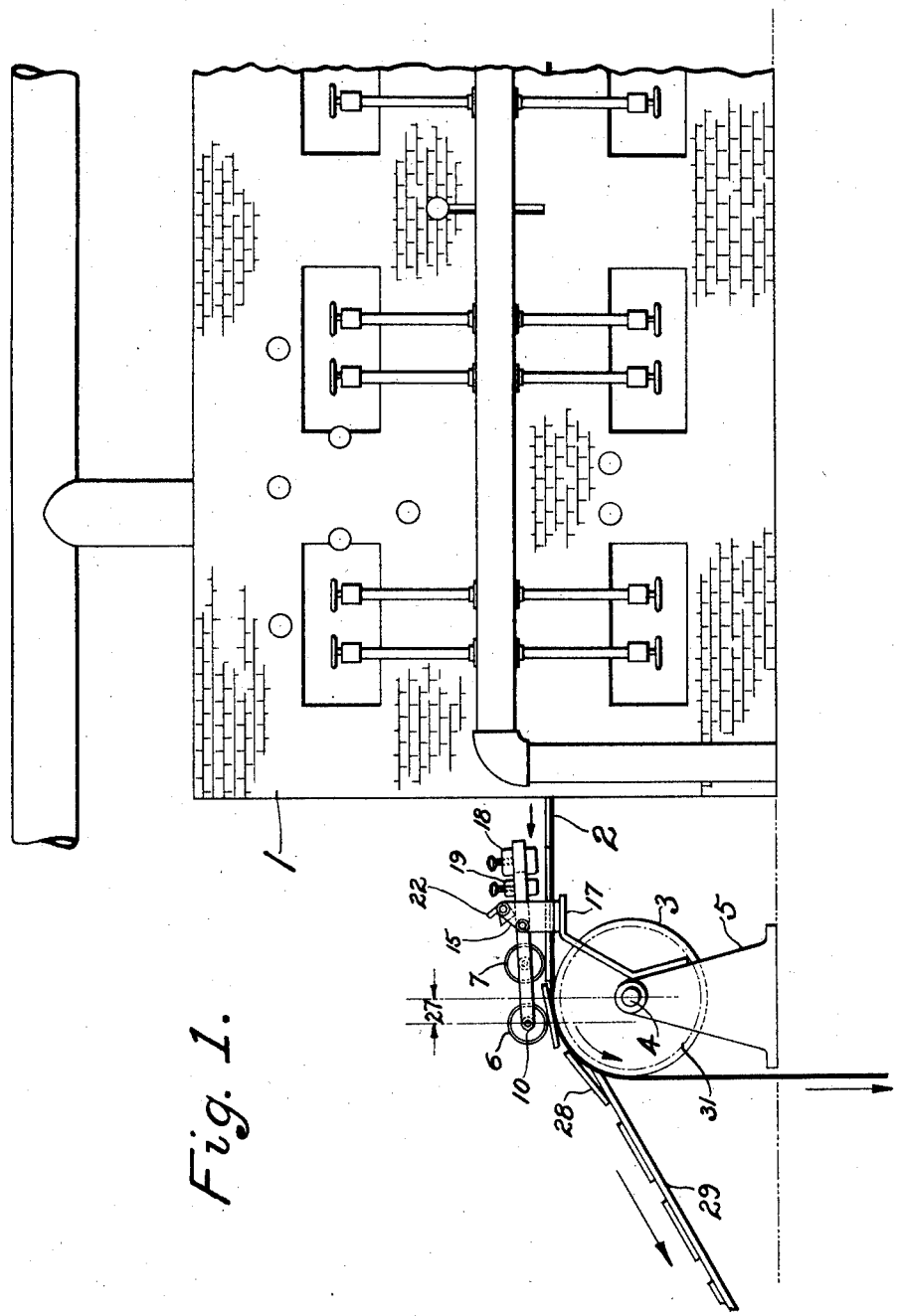
Figure 2:
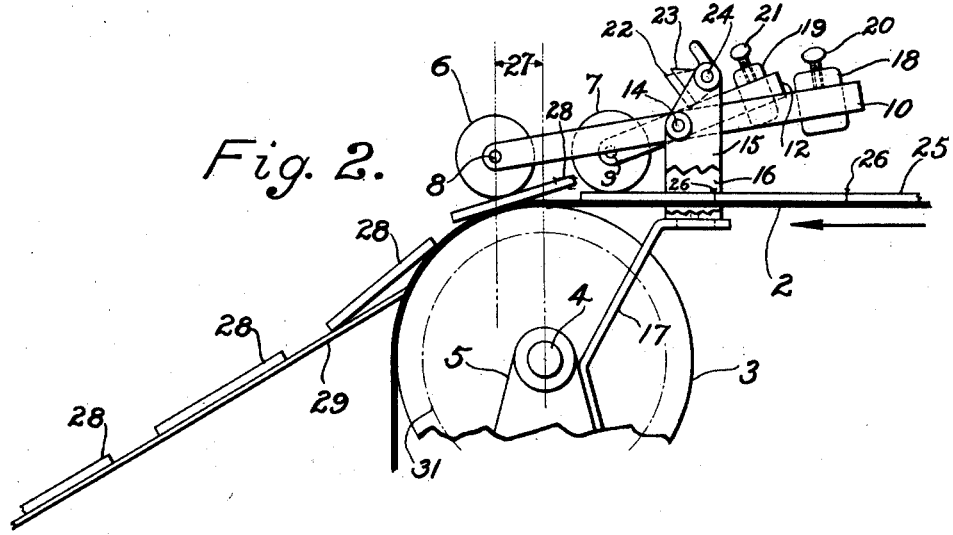
Figure 4:
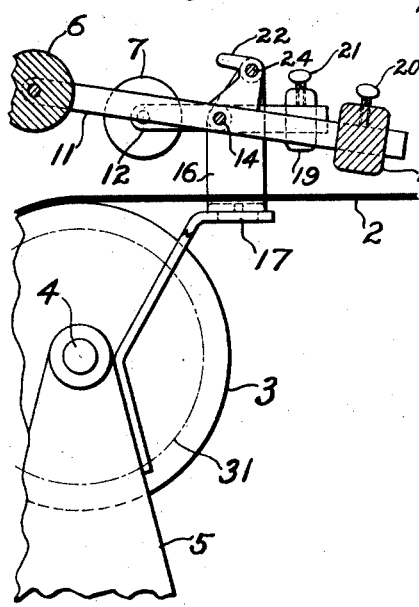
Figure 3:
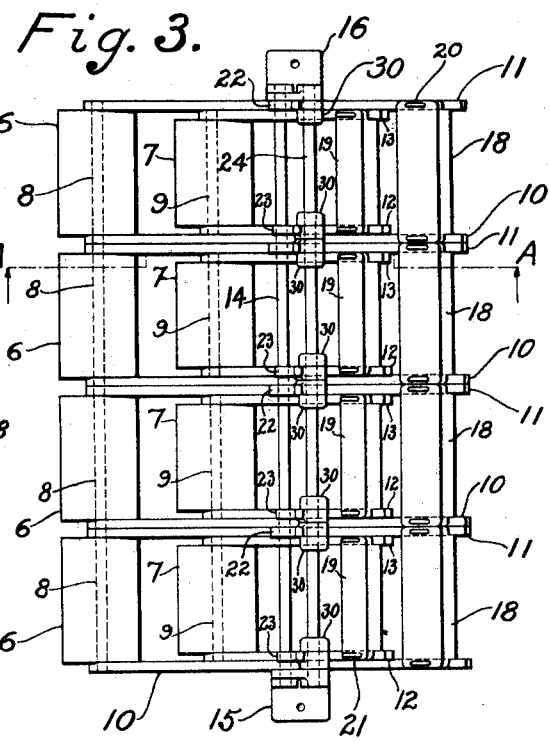

In said annexed drawings Figure 1 is a side elevation of my improved matzo breaker shown in connection with the delivery end of the bake-oven disclosed in the patent to Behr Manischewitz, Number 1,169,555; Fig. 2, an enlarged side elevation of the matzo breaker; Fig. 3, a plan view of the device shown in Fig. 2; Fig. 4, a fragmentary side view, partially taken at line A—A, Fig. 3, but showing the rolls out of working position.

Referring to the drawings, 1 indicates the oven and 2 the traveling apron on which the matzos or other products are baked while traveling through the oven 1. The traveling apron 2 passes over drive drum 3 which is mounted on shaft 4 and journaled in the brackets 5. Shaft 4 serves as driving member for drum 3. The breaker roll 6 rotates on shaft 8 which is securely fastened in side bars 10 and 11, or may be fastened on shaft 8 and said shaft rotate in the side bars 10 and 11. Another breaker roll 7 rotates on shaft 9 which is securely fastened in side bars 12 and 13, or may be fastened on shaft 9 and said shaft rotate in the side bars 12 and 13. The breaker rolls 6 and 7 are arranged singly, or they may be arranged in multiple sets, as shown in Fig. 3, depending upon the number of "ribbons" or strips of matzo or cracker dough that are being baked or that the oven is constructed for. In the drawings I have shown the matzo breaker arranged for four "ribbons" or strips of dough (Fig. 3), although I do not limit myself to any particular number.

The several sets of side bars, 10, 11, 12 and 13, are loosely mounted on shaft 14 which terminates in brackets 15 and 16 at each side of the matzo breaker. The arms 17, at each side, support the brackets 15 and 16 by either bolts or other suitable means, preferably with an arrangement made for forward and backward adjustment. The arms 17 are detachably fastened to the brackets 5 by any suitable means.

To vary the weight of the breaker rolls 6 and 7 to suit conditions that arise, I have shown adjustable balance weights 18 and 19 that may be slidably moved on side bars 10 and 11 and side bars 12 and 13, and secured thereto by any suitable means, such as the thumb screws 20 and 21.

It is advantageous to be able to throw either of the breaker rolls 6 or 7 out of operative position, or be able to throw both of said breaker rolls out of operative position (as shown in Fig. 4). This I accomplish by means of throw-out dogs 22 and 23, 22 holding the breaker roll 6 out of operative position and 23 holding breaker roll 7 out of operative position. The said throw-out dogs are loosely mounted on a through shaft 24 which terminates in brackets 15 and 16. Collars 30 serve to hold the throw-out dogs 22 and 23 in lateral position. In case all the series of breaker rolls 6 and 7 are to be thrown out of operative position the throw-out dogs 22 and 23 may be secured to shaft 24 and any suitable handle-means (not shown in the drawings) may be employed to operate said shaft 24.

The "ribbon" or strip of matzos is indicated by 25, and 26 indicate slight impressions or indentations made for the purpose of predetermining the length of the matzo and also to enable the matzo to break at this place. 27 indicates an amount of forward location I have found that the breaker roll successfully operates at, and will be explained later. 28 indicates the separated matzos, and 29 an inclined chute or other suitable means to carry the finished product away.

In practice, my improved matzo breaker operates as follows: The "ribbons" or strips of matzos and other forms of crackers to be baked are carried through the bake-oven 1 on a traveling apron 2, driven by drum 3 or any other suitable means mounted on shaft 4, and actuated by any suitable driving means such as the pulley 31, driven by any suitable means, preferably from a belt or flexible connection with the matzo machine (not shown in the drawings). The traveling apron 2 is of any suitable width to take care of the required number of "ribbons" or strips and the drum 3 of corresponding suitable width. The impressions or indentations 26 are stamped in the strips of dough in the matzo or cake machine prior to being placed on the apron 2. The indentations are of sufficient depth that the matzos do not break apart while being baked. As the baked strips 25 leave the bake-oven 1 they are pulled under the breaker rolls 7 and then under breaker rolls 6 by the travel of apron 2. The breaker rolls 6, being placed at a forward distance 27 from the center of drum 3, forces the matzo 28 to a tangent position as shown in Fig. 2, and breaks said matzo away from the main body or strip 25 at indentation 26, the weight of the breaker roll 7 holding the strip 25 close to the traveling apron 2. The matzos 28 then fall down the chute 29 by gravity, or they may be carried away by belts or other suitable means, and hence not shown in the drawings.

My improved matzo breaker also successfully operates to "break" or separate the matzos 28 from the main strip 25, by merely rolling over the said strip without reference to the breaker rolls' (6 and 7) location in respect to drum 3; but, I prefer to set the said breaker rolls as shown in Figs. 1 and 2 as less weight or force is required to break the strip 25 at indentations 26. This produces the most satisfactory finished product.

Various changes may be made in the arrangement and details of my invention without departing from the spirit of my invention as set forth in the following claims.

Having thus described my invention, what I claim as new, and desire to secure by Letters Patent, is—

1. A lower traveling member in combination with a plurality of gravity operated breaker rolls, and means to hold said breaker rolls out of operative position.

2. A lower traveling member in combination with a plurality of gravity operated breaker rolls, means to regulate the weight of said breaker rolls, and means to hold said breaker rolls out of operative position.

3. A roller, a plurality of gravity operated breaker rollers over said roller, means to regulate the weight of said breaker rollers and means to hold said breaker rollers out of operative position.

4. A roller, a belt member on said roller and a pair of smaller rollers over said roller adapted to press against a strip of material carried on said belt, one of the said smaller rollers contacting said material over said larger roller while the other smaller roller contacts the material beyond the line where the belt member contacts the roller.

5. A device of the character described comprising a roller, means for feeding a strip of material over said roller, and two relatively smaller rollers yieldingly mounted adjacent said roller so that said smaller rollers will contact the strip of material on lines spaced relative to the line of contact of the plane of the material tangential to the roller.

6. A roller, a plurality of gravity operated breaker rollers over said roller and adjustable weights having connection with said breaker rollers, as and for the purpose set forth.

In testimony whereof I affix my signature.

JACOB U. MANISCHEWITZ.